Feb. 14, 1967   C. G. HOGE   3,304,078
MEANS FOR ALIGNMENT OF COMPONENTS OF A FABRICATED ARTICLE
Filed April 22, 1964
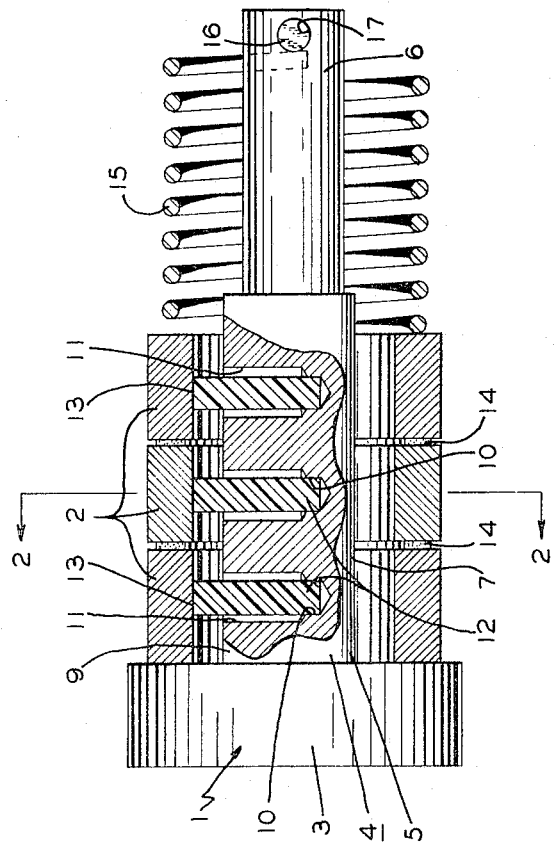
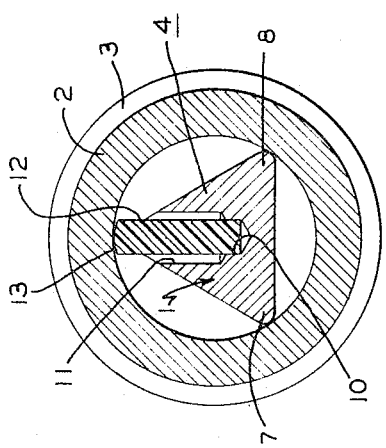
INVENTOR.
CARL G. HOGE
BY
*Ralph W. McIntire*
ATTORNEY 3,304,078
MEANS FOR ALIGNMENT OF COMPONENTS OF
A FABRICATED ARTICLE
Carl G. Hoge, Pittsburgh, Pa., assignor to Westinghouse
Air Brake Company, Wilmerding, Pa., a corporation of
Pennsylvania
Filed Apr. 22, 1964, Ser. No. 361,780
7 Claims. (Cl. 269—52)

This invention relates generally to means for coaxially aligning components of a fabricated article, and relates particularly to a mandrel for coaxially aligning segments of a fabricated bushing while an adhesive between the segments is being cured to fix the segments in the aligned position.

Heretofore, a wide variety of jigs, including mandrels, have been proposed for coaxially aligning elements or segments of an article during fabricating thereof. Generally, these mandrels have taken the form of mechanical devices including sensitive, mechanically adjustable, gripping means or fingers for holding the segments either on their outer peripheries or their inner peripheries to hold them in predetermined aligned position during the performance of work thereon. These devices require various types of relatively complicated adjustable means, such as micrometer screws, to perform their function properly, and thus are relatively expensive to manufacture.

It is the object of the present invention to provide a relatively simple, inexpensive mandrel which presses and holds a plurality of segments into abutting relationship one with the other during a heating process for curing adhesive between the segments, and, at the same time, automatically aligns the segments to form a common bore therein for minimizing the amount of honing required to form the bore after the curing process is completed.

This object is achieved by constructing a mandrel which will automatically align the segments of an article in response to the application of heat to the segments and the mandrel during the cement curing heating process. The segments are held on the mandrel by a spring means compressed between the end of the mandrel and the end segment of a plurality of segments so disposed on the mandrel body. The mandrel body is preferably generally triangular in cross section and is drilled to provide bores at intervals along one of the ridges along its length for receiving in each bore a pin extending perpendicularly outwardly from the mandrel axis. The mandrel body preferably is comprised of a material having a coefficient of expansion substantially the same as that of the segments. The pins are constructed from a material having a relatively higher rate of expansion than that of the material from which the mandrel and the segments are constructed so that the application of heat to the mandrel, pins, and the segments disposed thereon, causes the pins to expand faster than the mandrel body and the segments to thus effect engagement of one of the pins with the inner periphery of each of the segments. The engagement of the pins with the segments, and the further linear expansion of the pins thereafter, causes the pins to be placed under compression against the segments which, in turn, causes the segments to be positively engaged with the remaining two corners or ridges of the triangularly shaped mandrel, thus effecting a positive alignment of the segments with each other and forming a common bore therein. Upon cooling the mandrel and segments after the curing process is completed, the pins will retract to their normal length, thus releasing the fabricated article to facilitate removal thereof from the mandrel.

These and other objects will become readily apparent from the following description taken in conjunction with the drawing, in which:

FIG. 1 is a side elevational view, taken partly in cross section, of a mandrel showing the present invention, and showing segments of an article to be fabricated disposed thereon; and FIG. 2 is a cross-sectional view of the invention of FIG. 1, taken substantially along the line 2—2 of FIG. 1.

Referring now to FIGS. 1 and 2 of the drawing, there is shown a mandrel generally indicated at 1, and having the segments 2 of an article, such as a bushing, disposed thereon for curing into a fabricated bushing. The mandrel 1 generally comprises a flat base 3, and a body 4 centrally attached in any suitable manner to one side of the base 3. The body 4 comprises a first portion 5 disposed adjacent the base 3 and having a triangular cross section, and a second integral portion comprising a cylindrical stem 6 disposed on the distal end of the triangular portion 5. The portion 5, by its triangular cross-sectional construction, forms on its outer periphery three parallel, spaced ridges or corners 7, 8 and 9 extending along its length, each ridge having a radius of curvature preferably slightly less than the radius of curvature of the inner diameter of the segments 2, one of the ridges 9 (shown in FIG. 1) being drilled at intervals along its length to form a plurality of spaced bores 10, each bore 10 having its axis disposed in perpendicular relationship with the axis of the body 4, and each bore having a counterbore 11 associated therewith, for a purpose hereinafter explained.

Into each bore 10 is disposed a pin 12 having its inner end press-fitted into bore 11 and having its outer end 13 normally substantially coinciding with the ridge 9, the radius of curvature of the outer end 13 being preferably slightly less than the radius of curvature of the inside diameter of the segments 2 disposed on the mandrel. In the drawing, the pins 12 are shown in their extended condition, as hereinafter described.

As generally described above, the mandrel body 4 and the pins 12 are composed of different materials selected for the different rates of expansion to securely engage and effect alignment of the segments 2 when exposed to the temperature required to cure the cement 14 disposed between the segments 2 of the article to be fabricated by the curing process. Preferably, the body 4 is comprised of a material having substantially the same as or slightly lower than the coefficient of expansion of the segments so that expansion of the body and segments will effect a minimum amount of relative movement therebetween to avoid separation or undue squeezing of the segments. One such combination of materials found to be suitable for use within the temperature ranges necessary to cure a number of commercially available cements, disposed between nickel-silver or brass segments, is brass, having a coefficient of linear expansion of $18 \times 10^{-6}$ per degree C. for the mandrel body 4, and tetrafluoroethylene, having a coefficient of linear expansion of $5.5 \times 10^{-5}$ per degree C. for the pins 12, the latter material being particularly desirable because of its low coefficient of friction which allows slipping of the segments thereon for more positive seating of the mandrel corners against the segments, as hereinafter described. Other combinations of different materials are also suitable, it being necessary only that the sum of the coefficients of expansions of the pins 12 and the body 4 be higher than that of the segments and that the melting points of the materials be higher than the selected temperature required to cure the selected cement or to perform other work upon the segments 2. For example, another combination of materials suitable for use in the present invention, but more expensive than the aforementioned example, is a high nickel steel known as Invar, having a coefficient of linear expansion of $.8 \times 10^{-6}$ per degree C. for the body 4, and aluminum, having a coefficient of linear expansion of $2.24 \times 10^{-5}$ per degree C. for the pins 12.

In order to hold the segments 2 upon the mandrel 1 in abutting relationship, a coil spring 15 is disposed on the stem portion 6 of the body 4 in a compressed condition between the outer end of the last segment 2 placed upon the mandrel and a rod 16 disposed through an aperture 17 in the distal end of stem portion 6.

In the operation of the invention, a plurality of segments 2, having an inside diameter greater than the maximum outer diameter of the mandrel body 4, are provided on their ends with a cement 14 and are placed in sequence upon the mandrel body 4, with the first segment 2 abutting the base 3 and with the remaining segments disposed in abutting relationship one with the other. The spring 15 is placed upon the body 4 and compressed between the last segment 2 and the rod 16 inserted in the aperture 17 after the spring is compressed, as described above. The entire assembly of mandrel 1 and segments 2 is then heated to the curing temperature of the cement 14, during which heating process the pins 12 linearly expand at a faster rate than the body 4 into engagement with the segments 2 to tightly engage the inner periphery of each segment 2 with the two ridges 7 and 8 and with the outer end 13 of the pins 12 to effect near perfect alignment of the segments 2 with one another while the cement is being cured. Lateral expansion of pins 12 is provided for by the counterbores 11 which have a diameter greater than the maximum lateral expansion of the pins to prevent binding of the pin in the counterbore and thus permit uninhibited uniform linear expansion and contraction of the pins as the temperature changes. At the conclusion of the curing process, the assembly of the mandrel 1 and the segments 2 is cooled, thus effecting retraction of the pins 12 to their normal length, as described above, to release the segments 2 which are now fabricated into a unitary article, whereupon the rod 16 is removed, releasing the spring 15, which is, in turn, removed, thus facilitating removal of the fabricated article from the mandrel 1.

Having now described the invention, what I claim as new and desire to secure by Letters Patent, is:

1. A mandrel for coaxially aligning thereon a plurality of segments in tandem abutting relationship, comprising:
    (a) an elongated body having a triangular cross section along at least a portion of its length forming three edges, at least two of the included angles of said triangular cross section being equal,
    (b) a plurality of bores in said body and disposed in predetermined spaced relationship along one of said three edges of said body, each bore extending perpendicular to and having an axis intersecting with the axis of said body,
    (c) each bore having a counterbore.
    (d) a plurality of pins, each having an outer diameter substantially the same as that of said bore and having one end press-fitted into said bore and having the outer end of each pin normally disposed substantially adjacent the opening of said counterbore, and
    (e) each of said pins comprised of a material having a coefficient of linear expansion greater than that of said body and said segments whereby an increase in temperature thereof effects lengthening of said pins to provide engagement of said pins with the inside periphery of said segments and effects engagement of the remaining two edges of said body disposed opposite said one edge into engagement with different portions of the segments thereby effecting alignment of the inner peripheries of said segments one with another.

2. The mandrel of claim 1, and further characterized in that the radius of curvature of each of said two edges is less than the radius of curvature of the inside periphery of said segments, and the radius of curvature of the distal end of each of said pins is slightly less than that of the inside periphery of said segments.

3. The mandrel of claim 1, and further characterized in that said pins are comprised of tetrafluoroethylene.

4. The mandrel of claim 3, and further characterized in that said body is comprised of brass.

5. Means for coaxially aligning a plurality of annular segments, having internal bores of the same size, during a work step of fabricating an article requiring the application of heat to said segments, comprising:
    (a) a body insertable within said segments, said body having two ridges extending parallel to the axis thereof for coaxially aligning the segments and having a plurality of parallel bores therein disposed at predetermined intervals along its length with the axis of each bore being disposed perpendicular to a plane through the lines of contact of said two ridges with said segments, each bore having a counterbore;
    (b) a plurality of pin means carried by said body and comprised of a material having a coefficient of linear expansion greater than that of said body, each of said pin means being operable in response to an increase in temperature to engage the internal surface of said annular segments at a point on a line equidistant from the line of contact of each of said two ridges with the internal surface of the said segments, in cooperation with said two ridges to hold said segments in alignment only until said increase in temperature is reduced, and
    (c) each of said pins having a substantially constant outside diameter throughout its length and being disposed in one of said bores with one end press-fitted in the corresponding bore and extending through the corresponding counterbore with the distal end disposed adjacent the open end of the corresponding counter bore and operable to expand outwardly from said corresponding counterbore in response to said increase in temperature.

6. A mandrel for coaxially aligning thereon a plurality of annular segments having internal bores of the same size, comprising:
    (a) an elongated body having spaced parallel ridge means extending longitudinally thereon for coaxially aligning the segments and having a plurality of bores therein each extending perpendicular to the axis of said body, each of said bores having a counterbore;
    (b) a plurality of pins comprised of a material having a coefficient of linear expansion greater than that of said body and spaced along said body in opposition to said ridge means for extending laterally of said body into engagement with the inner periphery of said segments and for effecting engagement of said ridge means with said inner periphery of said segments when the temperature of said pins is increased; and
    (c) said pins having a substantially constant outer diameter throughout their length and each disposed in one of said counterbores and press-fitted in the corresponding bore.

7. A mandrel for coaxially aligning thereon a plurality of annular segments having internal bores of the same size, comprising:
    (a) an elongated body having spaced parallel ridge means extending longitudinally thereon for aligning the segments;
(b) finger means spaced along said body in opposition to said ridge means for extending laterally of said body into engagement with the inner periphery of said segments and for effecting engagement of said ridge means with said inner periphery of said segments when the temperature of said finger means and said body is increased, and
(c) said finger means being comprised of a material having a coefficient of linear expansion greater than that of said body.

References Cited by the Examiner

UNITED STATES PATENTS

| | | | |
|---|---|---|---|
| 2,012,443 | 8/1935 | Coe | 29—493 |
| 2,423,869 | 7/1947 | Blessing | 156—60 |
| 2,424,878 | 7/1947 | Crook | 269—48.1 |
| 2,458,802 | 1/1949 | Spencer | 29—472.3 |

FOREIGN PATENTS

| | | |
|---|---|---|
| 538,606 | 3/1957 | Canada. |
| 1,254,117 | 4/1960 | France. |

HAROLD D. WHITEHEAD, *Primary Examiner.*